(12) United States Patent
Meinhardt et al.

(10) Patent No.: US 12,188,421 B2
(45) Date of Patent: Jan. 7, 2025

(54) QUICK START FUEL SYSTEM FOR GASEOUS FUEL INTERNAL COMBUSTION ENGINE AND METHOD

(71) Applicant: Caterpillar Inc., Peoria, IL (US)

(72) Inventors: Steven W. Meinhardt, West Lafayette, IN (US); Andrew C. Gaarder, Lafayette, IN (US); Andrew D. Palmer, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/102,939

(22) Filed: Jan. 30, 2023

(65) Prior Publication Data

US 2024/0254933 A1  Aug. 1, 2024

(51) Int. Cl.
| F02D 19/06 | (2006.01) |
| F02M 21/02 | (2006.01) |
| F02M 35/10 | (2006.01) |

(52) U.S. Cl.
CPC ..... *F02D 19/0607* (2013.01); *F02D 19/0649* (2013.01); *F02D 19/0681* (2013.01); *F02M 21/0215* (2013.01); *F02M 21/0233* (2013.01); *F02M 21/0242* (2013.01); *F02M 21/0245* (2013.01); *F02M 35/10216* (2013.01)

(58) Field of Classification Search
CPC ............... F02D 19/105; F02D 19/0642; F02D 19/0647; F02M 21/0212; F02M 21/0215; F02N 2019/002
See application file for complete search history.

(56) References Cited

U.S. PATENT DOCUMENTS

| 4,441,467 A | | 4/1984 | Powell | |
| 4,918,844 A | * | 4/1990 | Marsh | E01H 4/023 37/227 |
| 5,566,653 A | * | 10/1996 | Feuling | F02D 19/0631 123/576 |
| 6,044,825 A | * | 4/2000 | Carter | F02M 21/06 123/557 |
| 6,935,114 B2 | | 8/2005 | Hajek et al. | |
| 7,717,077 B2 | | 5/2010 | Prior | |
| 10,473,041 B1 | * | 11/2019 | Harris | B64C 39/024 |
| 2006/0236986 A1 | * | 10/2006 | Fujisawa | F02M 21/0215 123/527 |

(Continued)

FOREIGN PATENT DOCUMENTS

| CN | 1050172 C | 3/2008 |
| EP | 2072809 A1 | 6/2009 |

*Primary Examiner* — Kevin A Lathers
(74) *Attorney, Agent, or Firm* — Brannon Sowers & Cracraft PC

(57) ABSTRACT

A gaseous fuel engine system includes a quick start fuel system having a pressurized gaseous fuel supply, a fuel feed conduit and a quick start fuel admission valve. The fuel feed conduit is coupled to an intake conduit for the engine at a downstream fuel admission location. A main fuel system is coupled to the intake conduit at an upstream fuel admission location. The quick start fuel admission valve is electrically actuated to admit a pressured gaseous fuel from the pressurized gaseous fuel supply for quick starting the gaseous fuel internal combustion engine. The quick start fuel may have a fuel composition different than a fuel composition of the main fuel.

14 Claims, 3 Drawing Sheets

(56) References Cited

U.S. PATENT DOCUMENTS

| | | | |
|---|---|---|---|
| 2011/0259285 A1* | 10/2011 | Michikawauchi | F02M 31/18 123/3 |
| 2012/0298079 A1* | 11/2012 | Bartolotta | F02G 5/00 123/557 |
| 2017/0037796 A1* | 2/2017 | Collie | F02D 33/003 |
| 2018/0038328 A1* | 2/2018 | Louven | F02M 21/0245 |
| 2021/0404422 A1* | 12/2021 | Chang | B01F 25/31331 |

\* cited by examiner

QUICK START FUEL SYSTEM FOR GASEOUS FUEL INTERNAL COMBUSTION ENGINE AND METHOD

TECHNICAL FIELD

The present disclosure relates generally to a gaseous fuel engine system, and more particularly to a quick start fuel system in a gaseous fuel engine system.

BACKGROUND

Gaseous fuel internal combustion engines are used throughout the world for diverse purposes ranging from vehicle propulsion to pressurization and transfer of gases and liquids, to generation of electrical power. Gaseous fuel engines typically operate similarly to other internal combustion engines where a controlled combustion reaction of a fuel and air in cylinders in the engine is used to drive pistons to operate a crankshaft. Gaseous fuel engine systems offer advantages in some applications, including lower production of certain exhaust emissions such as particulate matter. Gaseous fuel engines can also be used in applications where a ready and abundant supply of naturally available gaseous fuel, such as national gas or certain biogenic fuels, exists. Examples include gas fields, wellfields, landfills, certain mines, and still others.

In some gaseous fuel engine implementations, the gaseous fuel is direct-injected into the cylinders, in others port-injected into intake ports for the engine, and in still others admitted into an intake system for the engine by way of fumigation. Starting a gaseous fuel engine typically includes rotating a crankshaft of the engine to reciprocate cylinders and commence drawing air and, depending upon the fuel delivery strategy, fuel into the engine for combustion. In certain applications it may be desirable to start an engine as quickly as practicable. In electric power generation or for backup power applications, for example, it can be advantageous for electric power supply to be as uninterrupted as possible or backup power available very rapidly to prevent system shutdowns or other problems. Accordingly, there is often a premium on starting gaseous fuel engines without delay, sometimes on the order of ten seconds or less. One known strategy for starting an engine operable on gaseous fuel is known from U.S. Pat. No. 6,935,114 to Hajek et al.

SUMMARY OF THE INVENTION

In one aspect, a gaseous fuel engine system includes a gaseous fuel engine having a plurality of cylinders formed therein, and an intake system having an intake conduit extending in an upstream to downstream direction between an intake air inlet and the plurality of cylinders. The gaseous fuel engine system further includes a main fuel system having a main fuel admission valve coupled to the intake conduit at an upstream fuel admission location, and a quick start fuel system having a pressurized gaseous fuel supply, a fuel feed conduit and a quick start fuel admission valve. The fuel feed conduit is coupled to the intake conduit at a downstream fuel admission location. The quick start fuel admission valve is electrically actuated and positioned fluidly between the intake conduit and the pressurized gaseous fuel supply to admit a pressurized gaseous fuel via the fuel feed conduit for quick starting the gaseous fuel engine.

In another aspect, a method of operating a gaseous fuel engine system includes rotating a crankshaft of a gaseous fuel engine to reciprocate pistons in a plurality of cylinders in the gaseous fuel engine, and opening a quick start fuel admission valve to feed a quick start gaseous fuel through an intake conduit into the plurality of cylinders. The method further includes combusting the quick start gaseous fuel in the plurality of cylinders to start the gaseous fuel engine, and operating a compressor in an intake system for the gaseous fuel engine based on a flow of exhaust produced by the combustion of the quick start gaseous fuel. The method still further includes feeding a main gaseous fuel and pressurized air from the intake conduit into the plurality of cylinders based on the operation of the compressor, and combusting the main gaseous fuel in the plurality of cylinders.

In still another aspect, a quick start fuel system for a gaseous fuel internal combustion engine includes a pressurized quick start gaseous fuel supply, and a conduit section structed for fluidly connecting a compressor to an intake manifold in an intake system for a gaseous fuel internal combustion engine. The quick start fuel system further includes a fuel feed conduit coupled to the conduit section, and an electrically actuated quick start fuel admission valve positionable fluidly between the conduit section and the pressurized quick start gaseous fuel supply to admit the quick start gaseous fuel via the fuel feed conduit for quick starting the gaseous fuel internal combustion engine.

DETAILED DESCRIPTION

Figure 1:
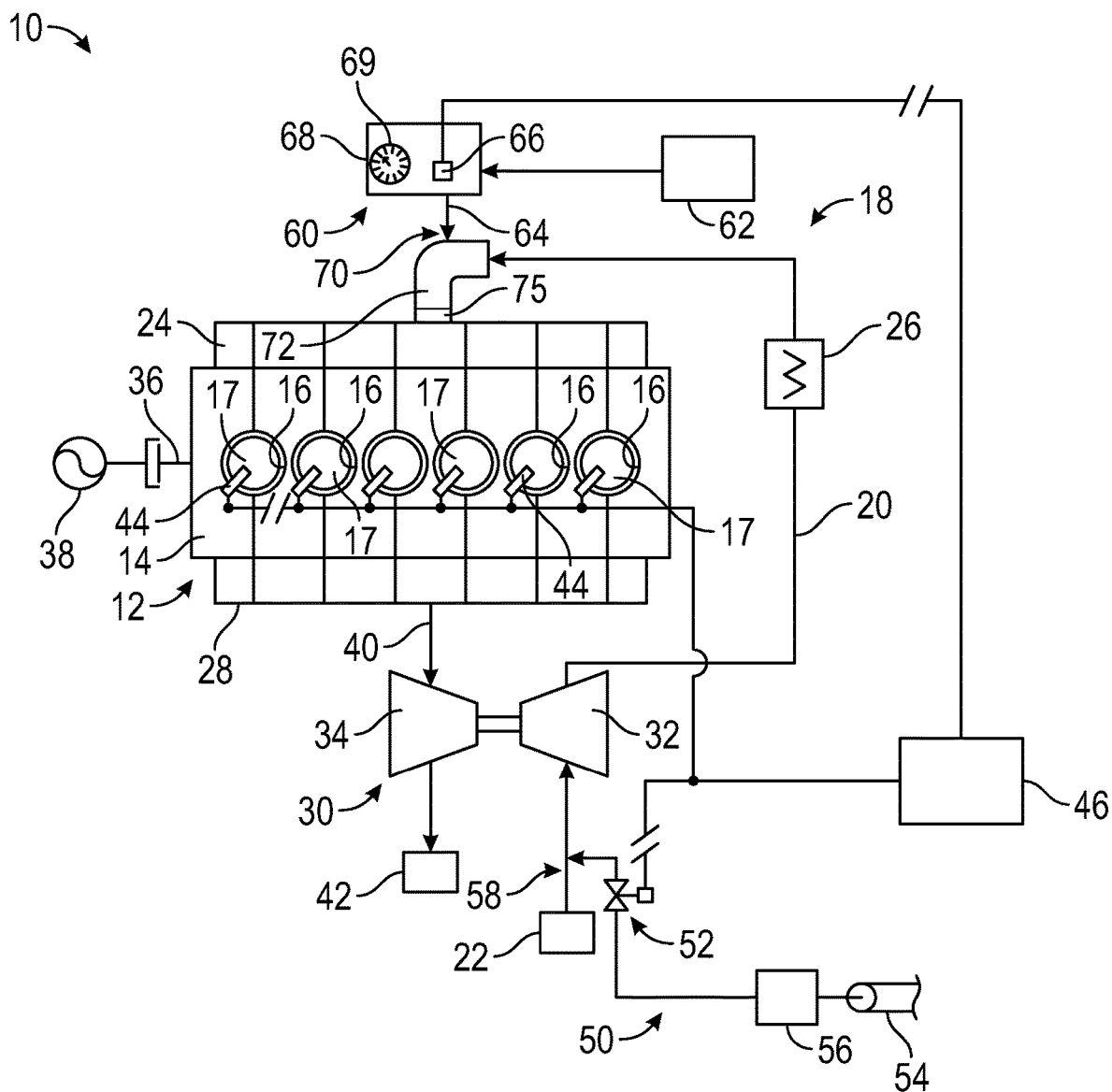
FIG. 1 is a diagrammatic view of a gaseous fuel engine system, according to one embodiment.

Referring to FIG. 1, there is shown a gaseous fuel internal combustion engine system 10 according to one embodiment. Engine system 10 includes a gaseous fuel internal combustion engine 12 having an engine housing 14 with a plurality of combustion cylinders 16 formed therein. A plurality of pistons 17 are positioned in cylinders 16 and movable between a bottom-dead-center position and a top-dead-center position in a generally conventional manner. Engine 12 may include any number of cylinders in any suitable arrangement such as an inline pattern, a V-pattern, or still another. Engine 12 may be spark-ignited and operable in a conventional four-stroke pattern, although the present disclosure is not limited in such regards. Engine 12 could be prechamber ignited or potentially dual fuel pilot ignited using a compression ignition liquid fuel.

Engine system 12 further includes an intake system 18 having an intake conduit 20 extending in an upstream to downstream direction between an intake air inlet 22 and cylinders 16. Intake system 18 also includes an intake manifold 24 coupled to engine housing 14. Intake manifold 24 receives a stream of pressurized intake air from an aftercooler 26 in the illustrated embodiment. Engine system 10 also includes an exhaust manifold 28 and a turbocharger 30. Turbocharger 30 includes a compressor 32 rotated by way of a turbine 34 exposed to a flow of exhaust from engine 12.

Engine 12 also includes a crankshaft 36 rotated by way of reciprocation of pistons 17. In the illustrated embodiment crankshaft 36 rotates to operate an electrical generator 38. In other applications crankshaft 36 could operate a different load such as a compressor, a pump, or a transmission in a land vehicle or a marine vessel to name a few examples. An exhaust conduit 40 conveys a flow of exhaust through turbine 34 and to an exhaust outlet 42. In some implementations aftertreatment equipment may be provided to remove undesired emissions in the exhaust. As noted above engine 12 may be spark-ignited. A plurality of spark plugs 44 are shown extending into cylinders 16. An electronic control unit 46 is electrically connected to spark plugs 44 in a generally conventional manner.

As also noted above, it can be desirable to start certain engines rapidly, particularly where operating a load such as an electrical generator is considered time sensitive. In some instances engine system 10 can be started to begin rotating generator 38 in less than 10 seconds. As further discussed herein, engine system 10 is uniquely configured for quick starting.

Engine system 10 also includes a main fuel system 50. Main fuel system 50 may include a main fuel admission valve 52 couple to intake conduit 20 at an upstream fuel admission location 58. In the illustrated embodiment upstream fuel admission location 58 is upstream of compressor 32 and permits rotation of compressor 32 to draw in/admit a main gaseous fuel from a main fuel supply 54 via fumigation. The main gaseous fuel mixes with intake air and is pressurized with the intake air in compressor 32 and fed in a downstream direction through intake conduit 20 to aftercooler 26 and thenceforth into intake manifold 24 and cylinders 16.

Main fuel supply 54 may include a line gas supply in some instances, such as may be available at a landfill, a gas field or wellfield, or other installations. A main gaseous fuel as contemplated herein may include natural gas including as a predominant component methane. Other gaseous fuels can include biogas, landfill gas, mine gas, or still others including various blends. The main gaseous fuel might also include a blend of natural gas and gaseous molecular hydrogen, for example. In still other instances, main fuel supply 54 could include a pressurized gaseous fuel supply or a liquified gaseous fuel supply such as liquified natural gas (LNG). Filtration equipment 56 may be positioned fluidly between main fuel supply 54 and main fuel admission valve 52. In other embodiments, rather than fumigation admission of the main gaseous fuel, the main gaseous fuel could be pressurized sufficiently for injection and delivered downstream of compressor 32.

It will be recalled engine system 10 may be configured for rapid starting. It has been observed that certain gaseous fuel engine systems may take longer to successfully start than is desired. The relatively slow starting may be a result of factors such as pressure of a main fuel supply, turbocharger lag, temperatures, or still other factors. In consideration of these and other shortcomings of known strategies, engine system 10 further includes a quick start fuel system 60. Quick start fuel system 60 includes a pressurized quick start gaseous fuel supply 62, containing a pressurized quick start gaseous fuel, a fuel feed conduit 64, and a quick start fuel admission valve 66. In some embodiments the quick start gaseous fuel has a fuel composition different than a fuel composition of the main gaseous fuel. The quick start gaseous fuel might include propane, stored in a pressurized propane cylinder, for example. Embodiments are also contemplated where the main gaseous fuel is, or is predominantly, natural gas and the quick start gaseous fuel is, or is predominantly, propane. Embodiments are nevertheless contemplated where the main gaseous fuel and the quick start gaseous fuel have the same composition. It will nevertheless typically be desirable for the main fuel supply 54 to include a lower pressure fuel supply and pressurized gaseous fuel supply 62 to include a higher pressure fuel supply.

The relatively higher pressure of the quick start gaseous fuel and the relatively more downstream fuel admission location 70 enable the quick start gaseous fuel to be rapidly introduced into cylinders 16 and ignited to quickly start engine 12 faster than would be practicable relying upon fuel admission via main fuel system 50 alone, as further discussed herein. Quick start fuel admission valve 66 may be electrically actuated and positioned fluidly between intake conduit 20 and pressurized quick start gaseous fuel supply 62 to admit pressurized gaseous fuel via fuel feed conduit 64 for quick starting engine 12.

Figure 2:
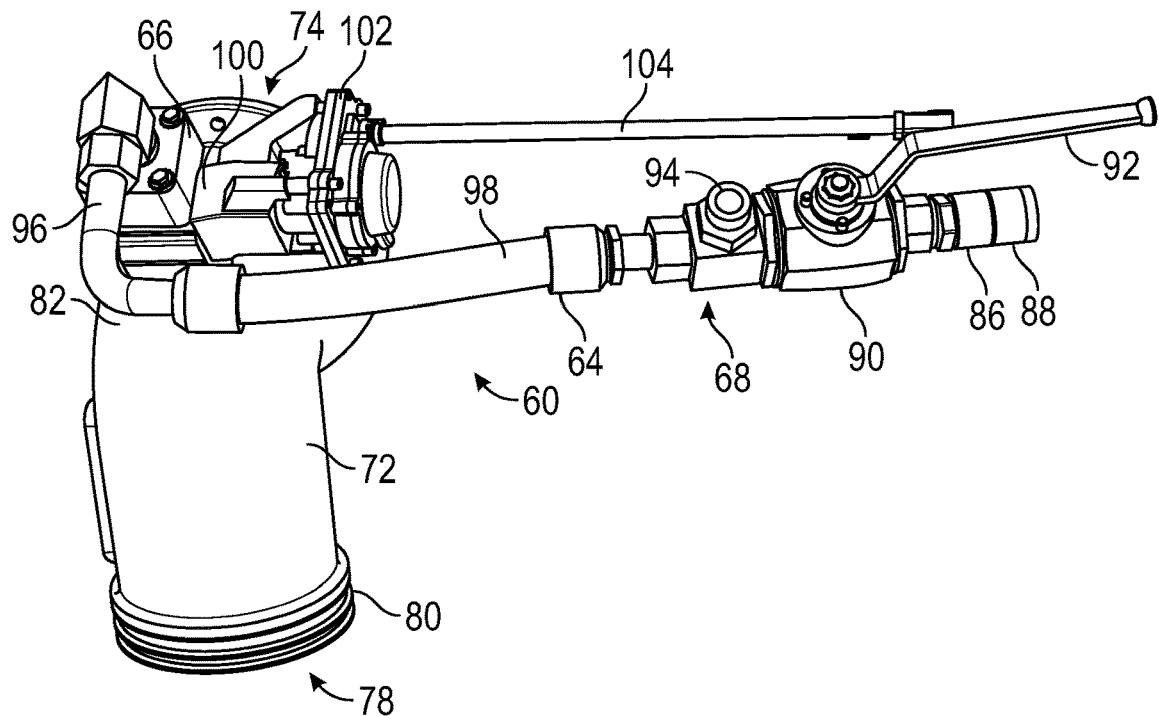
FIG. 2 is a diagrammatic view of a quick start fuel system, according to one embodiment.
Figure 3:
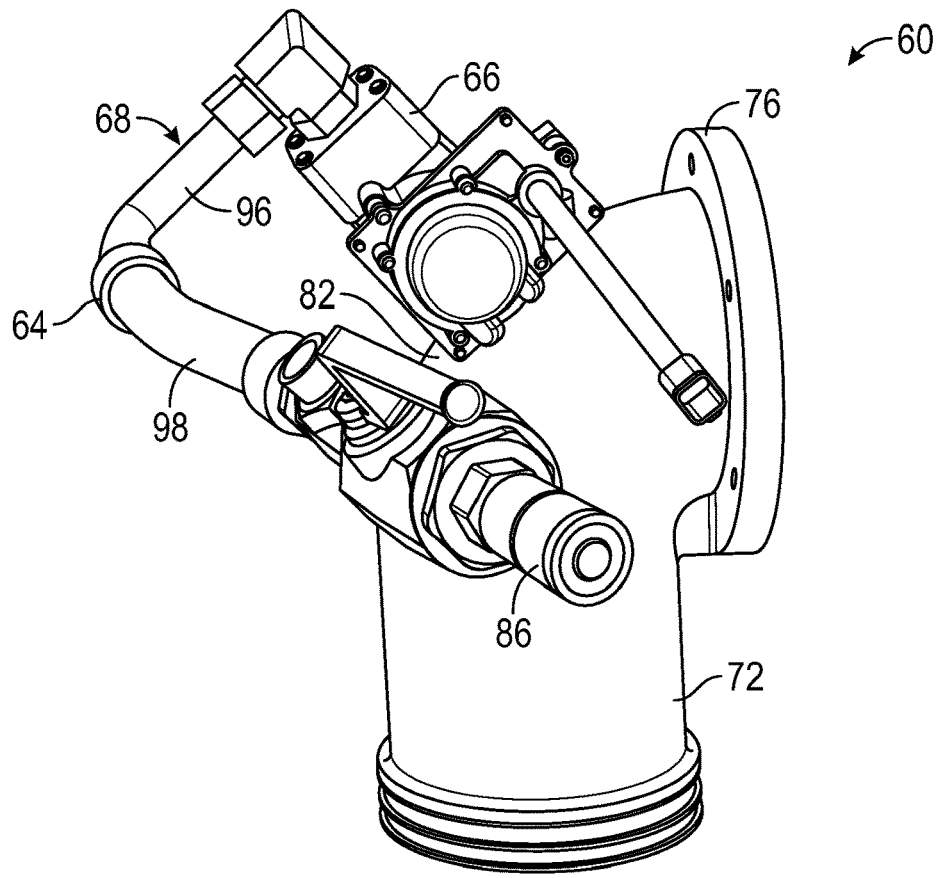
FIG. 3 is another diagrammatic view of the quick start fuel system as in FIG. 2.
Figure 4:
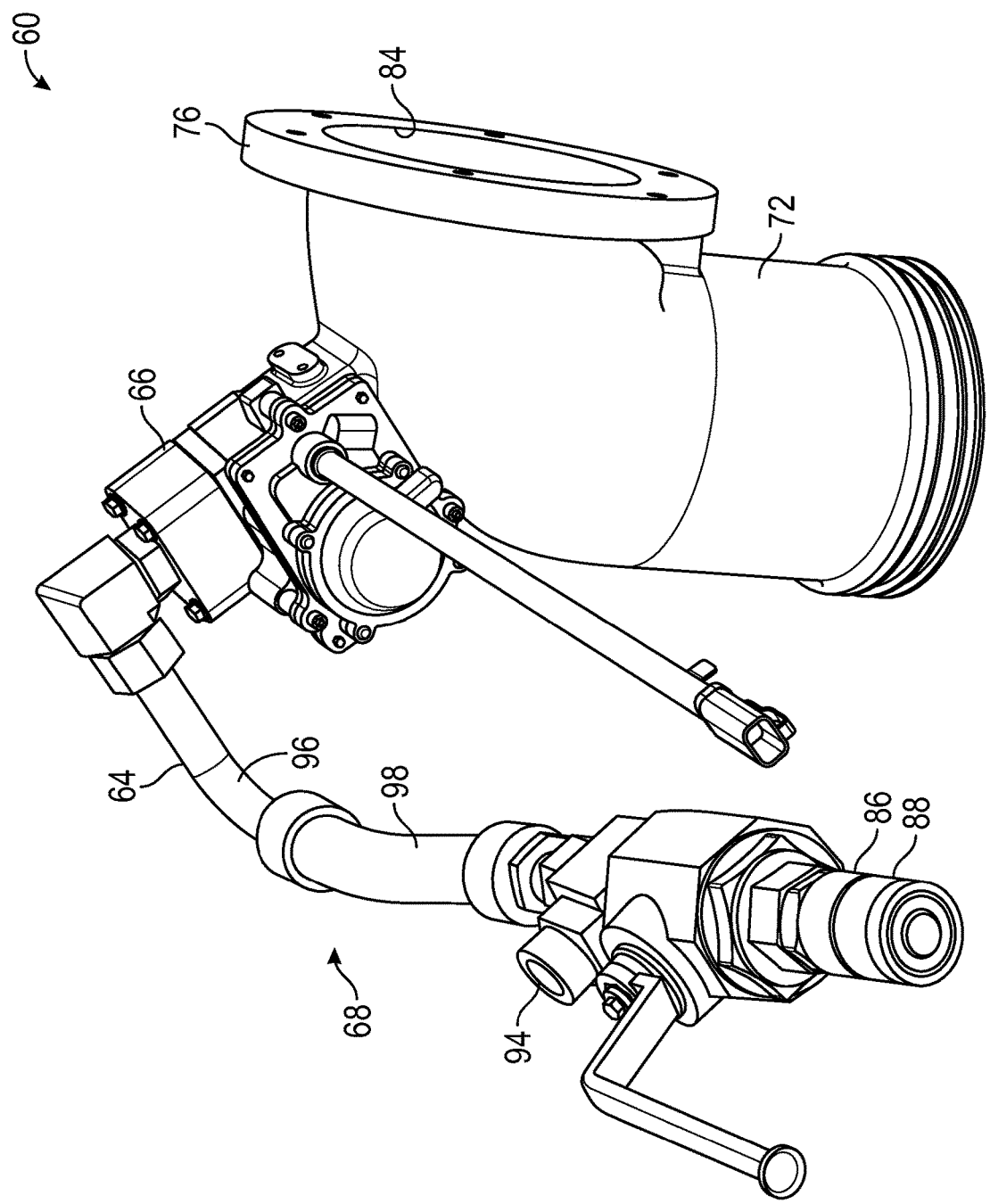
FIG. 4 is yet another diagrammatic view of the quick start fuel system as in FIGS. 2 and 3.

Referring also now to FIGS. 2-4 quick start fuel system 60 may further include a valve and line assembly 68 and a pressure sensing mechanism such as a pressure gauge 69. Intake conduit 20 may also include a conduit section 72 attached to intake manifold 24 such as by way of a fitting 75 and positioned to feed pressurized intake air and the main gaseous fuel into intake manifold 24. Fuel feed conduit 64 may be coupled such as by way of direct attachment to conduit section 72 at downstream fuel admission location 58.

In some embodiments quick start fuel system 60 might be provided as a retrofit kit that can be coupled to an existing gaseous fuel engine. Some versions of such an embodiment could include valve and line assembly 68 and conduit section 72 enabling conduit section 72 to be swapped in for an existing part of an intake conduit in an existing engine system. Conduit section 72 may also include an elbow connector in some embodiments. Conduit section 72 may include an upstream end 74 including an attachment flange 76, that receives a flow of pressurized intake air and, once engine has started, the main gaseous fuel, and a downstream end 78. Configured as an elbow connector conduit section 72 may include a central bend 82. Downstream end 78 may include one or more threads 80 or some other surface or surfaces configured for attachment with other equipment. A passage 84 extends in an upstream to downstream direction through conduit section 72.

Quick start fuel system 60 may further include a quick connector 86 fluidly connecting fuel feed conduit 64 to pressurized gaseous fuel supply 62. Quick connector 86 may include a collar or the like 88 that can be manipulated by a user to establish a fluid connection to pressurized gaseous fuel supply 62. Quick start fuel system 60 may further include a shutoff valve 90 having an external control lever or handle 92 that can be manipulated by a user to turn on or shut off fluid flow through fuel feed conduit 64. A port 94 is also formed in and fluidly connects to fuel feed conduit 64. Port 94 can enable sensing of a fuel pressure through fuel feed conduit 64 such as by way of gauge 69. An electronic pressure sensing device or a mechanical pressure sensing device might be used enabling an operator or a computer controller to control quick start fuel admission valve 66 as appropriate to begin, end, or modulate supplying of quick start gaseous fuel as discussed herein.

Fuel feed conduit 64 may further include a rigid line section 96 connected to quick start fuel admission valve 66, and a flexible line section 98. In the illustrated embodiment shutoff valve 90 is couple to flexible line section 98. Providing flexible line section 98 can assist in enabling a user or installation technician to easily position valve and line assembly 68 upon installation and suitably connect to pressurized gaseous fuel supply 62. Also shown in FIGS. 2-4 is a valve subassembly 100 of quick start fuel admission valve 66, and an actuator subassembly 102. Actuator subassembly 102 may include a suitable electrical actuator such as a solenoid actuator therein, connected by way of a protruding electrical connector 104 to electronic control unit 46.

INDUSTRIAL APPLICABILITY

Referring to the drawings generally, operating engine system 10 may include rotating crankshaft 36 to reciprocate pistons 17 in cylinders 16 in gaseous fuel engine 12. An electric starter motor or the like can be coupled to crankshaft 36 for starting purposes. When crankshaft 36 first begins to rotate and reciprocate pistons 17 turbocharger 30 has yet to begin to spin, or only minimally so. As such, compressor 32 is not rotating sufficiently to pressurize intake air and admit main gaseous fuel by way of fumigation.

Approximately at the time that crankshaft 36 beings to rotate, quick start fuel admission valve 66 may be opened to feed quick start gaseous fuel into intake conduit 20 and into cylinders 16. A pressure of pressurized gaseous fuel supply 62 can assist in the substantially immediate supply of fuel to cylinders 16. Spark plugs 44 can be energized to ignite the quick start gaseous fuel and combust the same in cylinders 16 to start gaseous fuel engine 12. Based on a flow of exhaust produced by combustion of the quick start gaseous fuel compressor 32 can be operated to pressurize intake air and begin admission of the main gaseous fuel from main fuel supply 54. Based on the operation of compressor 32 the main gaseous fuel and pressurized air can be fed from intake conduit 20 into cylinders 16 where the main gaseous fuel and air is ignited and combusted to commence full operation of engine system 10. It is contemplated that once engine system 10 begins operating on the main gaseous fuel quick start fuel admission valve 66 can be deenergized to end the flow of quick start gaseous fuel.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A gaseous fuel engine system comprising:
   a gaseous fuel engine having a plurality of cylinders formed therein;
   an intake system including an intake conduit extending in an upstream to downstream direction between an intake air inlet and the plurality of cylinders, and a compressor operated via a flow of exhaust from the gaseous fuel engine;
   a main fuel system including a main fuel admission valve coupled to the intake conduit at an upstream fuel admission location that is upstream of the compressor, for admission of a main gaseous fuel into the intake conduit;
   a quick start fuel system including a pressurized gaseous fuel supply, a fuel feed conduit, and a quick start fuel admission valve;
   the fuel feed conduit being coupled to the intake conduit at a downstream fuel admission location that is downstream of the compressor; and
   the quick start fuel admission valve being electrically actuated and positioned fluidly between the intake conduit and the pressurized gaseous fuel supply to admit a pressurized gaseous fuel via the fuel feed conduit for quick starting the gaseous fuel engine; and
   wherein the quick start fuel system further includes a quick connector fluidly connecting the fuel feed conduit to the pressurized gaseous fuel supply, and a shutoff valve positioned fluidly between the quick connector and the quick start fuel admission valve.

2. The gaseous fuel engine system of claim 1 wherein the intake system further includes an aftercooler, and an intake manifold, and wherein the upstream fuel admission location is upstream of the compressor for fumigation admission of a main gaseous fuel into the intake conduit.

3. The gaseous fuel engine system of claim 2 wherein the intake conduit includes a conduit section positioned to feed pressurized intake air and the main gaseous fuel into the intake manifold, and the fuel feed conduit is coupled to the conduit section at the downstream fuel admission location.

4. The gaseous fuel engine system of claim 3 wherein the conduit section includes an elbow connector.

5. The gaseous fuel engine system of claim 1 wherein the fuel feed conduit includes a rigid line section connected to the quick start fuel admission valve, and a flexible line section, and the shutoff valve is coupled to the flexible line section.

6. A gaseous fuel engine system comprising:
   a gaseous fuel engine having a plurality of cylinders formed therein;
   an intake system including an intake conduit extending in an upstream to downstream direction between an intake air inlet and the plurality of cylinders, and a compressor operated via a flow of exhaust from the gaseous fuel engine;
   a main fuel system including a main fuel admission valve coupled to the intake conduit at an upstream fuel admission location that is upstream of the compressor, for admission of a main gaseous fuel into the intake conduit;
   a quick start fuel system including a pressurized gaseous fuel supply, a fuel feed conduit, and a quick start fuel admission valve;
   the fuel feed conduit being coupled to the intake conduit at a downstream fuel admission location that is downstream of the compressor; and
   the quick start fuel admission valve being electrically actuated and positioned fluidly between the intake conduit and the pressurized gaseous fuel supply to admit a pressurized gaseous fuel via the fuel feed conduit for quick starting the gaseous fuel engine;
   wherein the main fuel system includes a lower pressure fuel supply containing a main gaseous fuel, and the pressurized fuel supply includes a higher pressure fuel supply containing a quick start gaseous fuel; and
   wherein the main fuel system includes a lower pressure fuel supply containing a main gaseous fuel, and the pressurized fuel supply includes a higher pressure fuel supply containing a quick start gaseous fuel.

7. The gaseous fuel engine system of claim 6 wherein the intake system further includes an aftercooler, and an intake manifold, and wherein the upstream fuel admission location is upstream of the compressor for fumigation admission of a main gaseous fuel into the intake conduit.

8. The gaseous fuel engine system of claim 7 wherein the intake conduit includes a conduit section positioned to feed pressurized intake air and the main gaseous fuel into the intake manifold, and the fuel feed conduit is coupled to the conduit section at the downstream fuel admission location.

9. The gaseous fuel engine system of claim 8 wherein the conduit section includes an elbow connector.

10. A quick start system for a gaseous fuel internal combustion engine comprising:
- a pressurized supply of a quick start gaseous fuel;
- a conduit section structured for fluidly connecting a compressor to an intake manifold in an intake system for a gaseous fuel internal combustion engine;
- a fuel feed conduit coupled to the conduit section;
- a shutoff valve; and
- an electrically actuated quick start fuel admission valve positionable fluidly between the conduit section and the pressurized supply of a quick start gaseous fuel to admit the quick start gaseous fuel via the fuel feed conduit for quick starting the gaseous fuel internal combustion engine;
- wherein the conduit section includes an elbow connector forming a bend between a first conduit end and a second conduit end, and the fuel feed conduit is attached to the conduit section between the first conduit end and the second conduit end at a fuel admission location.

11. The quick start system of claim 10 wherein the fuel feed conduit includes a rigid line section connected to the quick start fuel admission valve, and a flexible line section, and wherein the shutoff valve is coupled to the flexible line section and includes an external control lever.

12. The quick start system of claim 11 further comprising a quick connector positioned fluidly between the flexible line section and the pressurized supply of a quick start gaseous fuel.

13. The quick start system of claim 10 wherein the first conduit end includes a mounting flange, and the second conduit end includes a fitting.

14. The quick start system of claim 10 wherein the electrically actuated quick start fuel admission valve includes a valve subassembly, and an electrical actuator subassembly having a protruding electrical connector for electrically connecting to an electronic control unit.

* * * * *